Feb. 4, 1941.    J. LOUMIET ET LAVIGNE    2,230,253
SEPARATION OF LIQUIDS
Filed Feb. 18, 1937    7 Sheets-Sheet 4

INVENTOR.
Jean Loumiet et Lavigne.
BY
ATTORNEYS

Feb. 4, 1941. J. LOUMIET ET LAVIGNE 2,230,253
SEPARATION OF LIQUIDS
Filed Feb. 18, 1937 7 Sheets-Sheet 6

INVENTOR.
Jean Loumiet et Lavigne.
BY Moses & Nolte
ATTORNEYS.

Feb. 4, 1941.   J. LOUMIET ET LAVIGNE   2,230,253
SEPARATION OF LIQUIDS
Filed Feb. 18, 1937   7 Sheets-Sheet 7
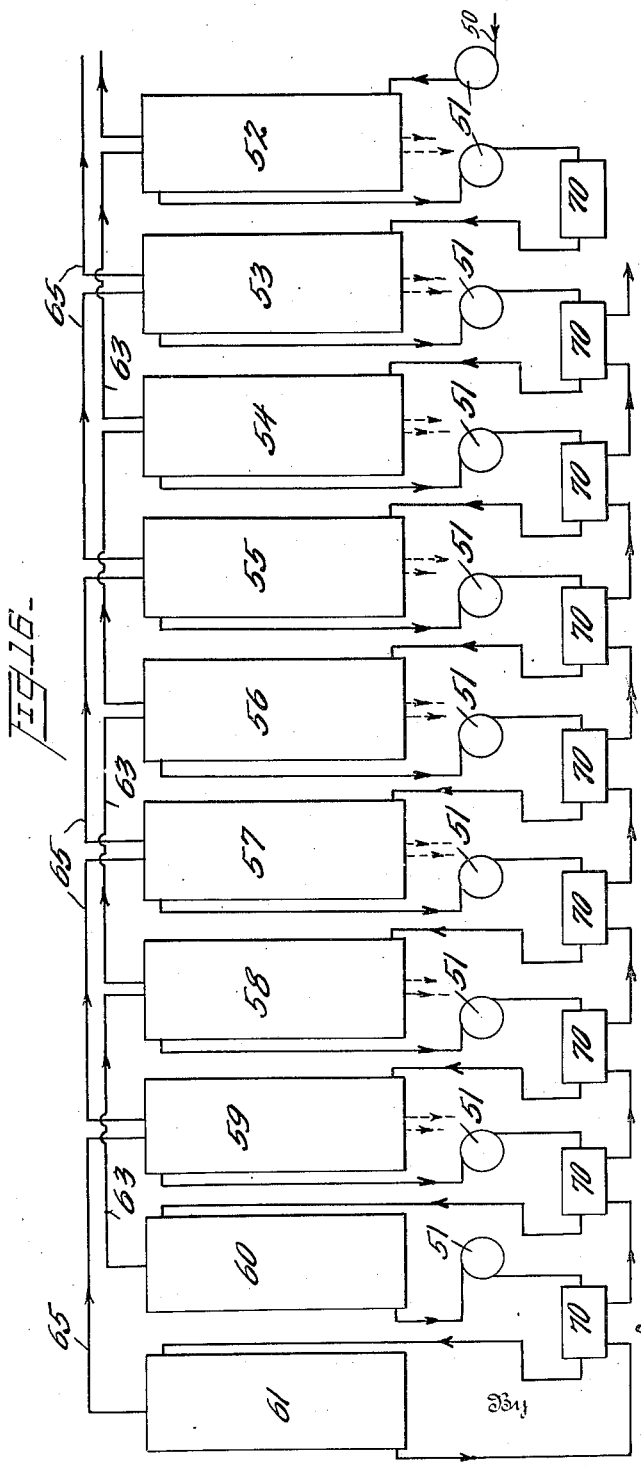

Patented Feb. 4, 1941

2,230,253

UNITED STATES PATENT OFFICE 2,230,253

SEPARATION OF LIQUIDS

Jean Loumiet et Lavigne, Itabo, Cuba

Application February 18, 1937, Serial No. 126,401
In Cuba June 29, 1936

11 Claims. (Cl. 196—73)

This invention relates to the separation of liquids, especially to separation employing fractional distillation and fractional condensation by multiple effects, and more particularly to a novel process for accomplishing such separation, and it relates also to improved apparatus for carrying the process into effect.

An object of the invention is to accomplish the separation from a body of liquid comprising admixed fluid constituents characterized by differences in volatility, of the several constituents, separating each according to its respective volatile characteristic.

A typical example of the useful application of the novel process herein disclosed is for the fractional distillation of petroleum, although this is only an illustrative use, as the process may be utilized in any field for which it is adapted by the nature of my improvements.

Furthermore, the use of the novel process in conjunction with the process of centrifugal separation of vapor from entrained liquid forming the subject-matter of my co-pending application for United States Letters Patent, Serial No. 99,317, filed September 3, 1936, presents notable advantages, which will be explained herein, but the utilization of the present invention is not dependent upon conjoint use with that process.

The novel process of the present invention, when viewed in its broad, or generic, aspect, provides for fractional vaporization of the mixture to be distilled by causing a stream thereof to flow successively through a series of confined zones heated at temperatures increasing progressively from zone to zone, so that in each of the zones the more volatile constituents of the mixture flowing therethrough are evaporated. It is a primary object to provide for heating the increasing liquid in each zone, except one or more zones at the end of the series, by the transmission through such zone of the residual liquid from the hottest zones, which has not been vaporized, and the condensate from the higher temperature zone or zones, in addition to the vapor to be condensed from at least the immediately preceding zone.

The vapor returned to a zone from a zone of higher temperature for condensation transmits its heat of vaporization to the incoming liquid in the zone. In this way, the latent heat of vaporization is recovered. The condensation of the vapors, however, does not serve to recover the heat which has been put into the residual liquid (never vaporized) nor the heat contained in the condensed fractions. The transmission of the residual liquid through all of the zones and the transmission of all the condensate from each zone through all of the lower temperature zones plays a very important part in the efficiency, economy and feasibility of the process. It makes available for recovery in each zone the specific heat contained in all the liquid transmitted outward from the next hotter zone, in addition to the latent heat of vaporization contained in the vapors transmitted outward from the next hotter zone. The fact that all of the heat, both latent and specific, is thus made available for recovery is of very great importance in enabling the fractionating to be carried out in a multiplicity of distinct steps. If the latent heat alone were recovered, the heat required for raising the liquid fractions to their vaporizing temperatures would all be lost, and the number of fractional steps would be drastically limited as compared with the capability of the present process.

It is a further point that the recovery of the specific heat enables the successive zones or effects to be balanced against one another so as to maintain a substantially uniform temperature difference between the vapors undergoing condensation and the liquid undergoing vaporization in each of the zones, so that a suitably rapid rate of heat interchange can be maintained throughout.

It is also an important point that the recovery of specific heat can be so regulated as between the zones that the heat transmitted to the liquid in each zone may be properly proportioned to carry the thermal load of that zone in accordance with the characteristics of the liquid being treated. One kind of petroleum for example, may be relatively rich in a given fraction, and relatively poor in another, while in a second kind of petroleum this situation may be reversed. The provision of specific heat recuperators in the several zones enables the extent of heat recuperation to be adjusted between the zones so that there will be relatively high recovery of heat in the zone in which a predominant fraction is vaporized and relatively low heat recovery in a zone in which a minor fraction is vaporized. The volatilization temperatures at equal pressures of the products of two successive zones will generally be too close to one another, when the fractional subdivision is very extended, to operate these adjacent zones under the same conditions of pressure, for the reason that there would be an insufficient drop in temperature as between the adjacent zones, to cause the interchange of heat between the vapors being condensed and the liquid being heated at a practically rapid rate.

It is accordingly another object of the present invention to provide for evaporation in the successive zones under pressures within the confined areas increasing step by step from one zone to the next. Provision for such increases in pressures may be desirably effected by suitable increases in the gravity head of the liquid being distilled, as by mounting the zone containers in stages decreasing in height in the direction of input flow. Alternatively the circulating mixture may be pumped from one zone container to another. This second, or dynamic, mode of procedure is regarded as more advantageous, both because it facilitates the installation of the apparatus, and also because it requires the least pumping effort. The disposition of the zone containers at heights which are successively greater from the last to the first in the system, requires that the entire body of liquid to be heated and vaporized must be pumped to the level necessary to provide an adequate gravity head and consequent pressure in the system.

In this connection it should be noted that the difference in temperature between the condensation of the heating vapor and that of the liquid which is evaporated in a given zone by the heat (derived from such condensation) arises from two causes: on the one hand, the greater volatility of the bodies which are evaporated as compared with those which are being condensed: and on the other hand the difference of pressure, for the regulation of which provision is made as already indicated briefly and which will be described more at length hereinafter.

In pursuance of the invention, another object is to provide an improved apparatus by which to carry into effect the novel process whose objects and features have been summarized briefly in the foregoing paragraphs.

Other objects and features will appear as the description of the particular physical embodiment selected to illustrate the invention progresses.

In the accompanying drawings, like characters of reference have been applied to corresponding parts throughout the several views which make up the drawings, in which.

Figure 1:
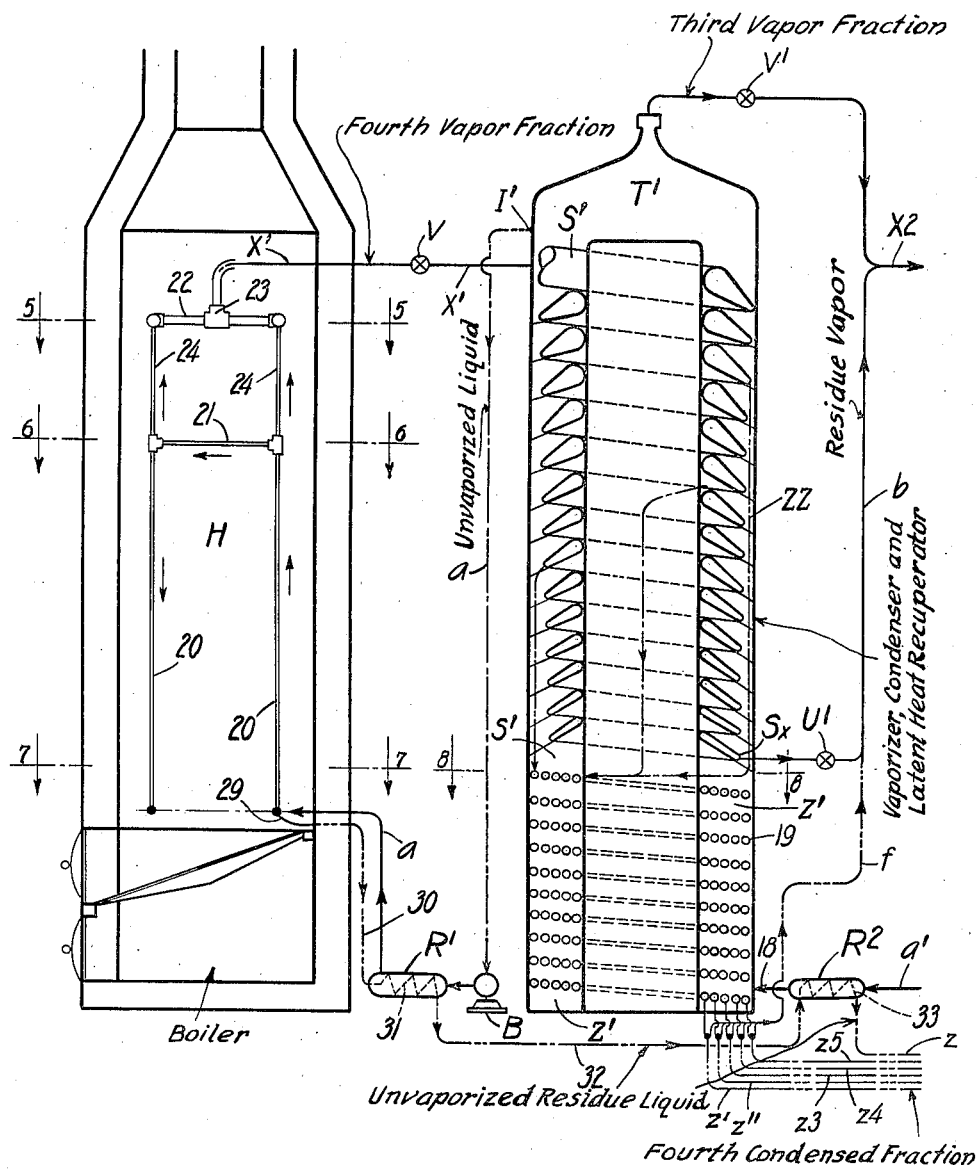
Fig. 1 is a schematic view in front elevation of part of an apparatus for the fractional centrifugal distillation of petroleum adapted to carry the invention into effect, and in the construction of which the present invention has been embodied.
Figure 2:
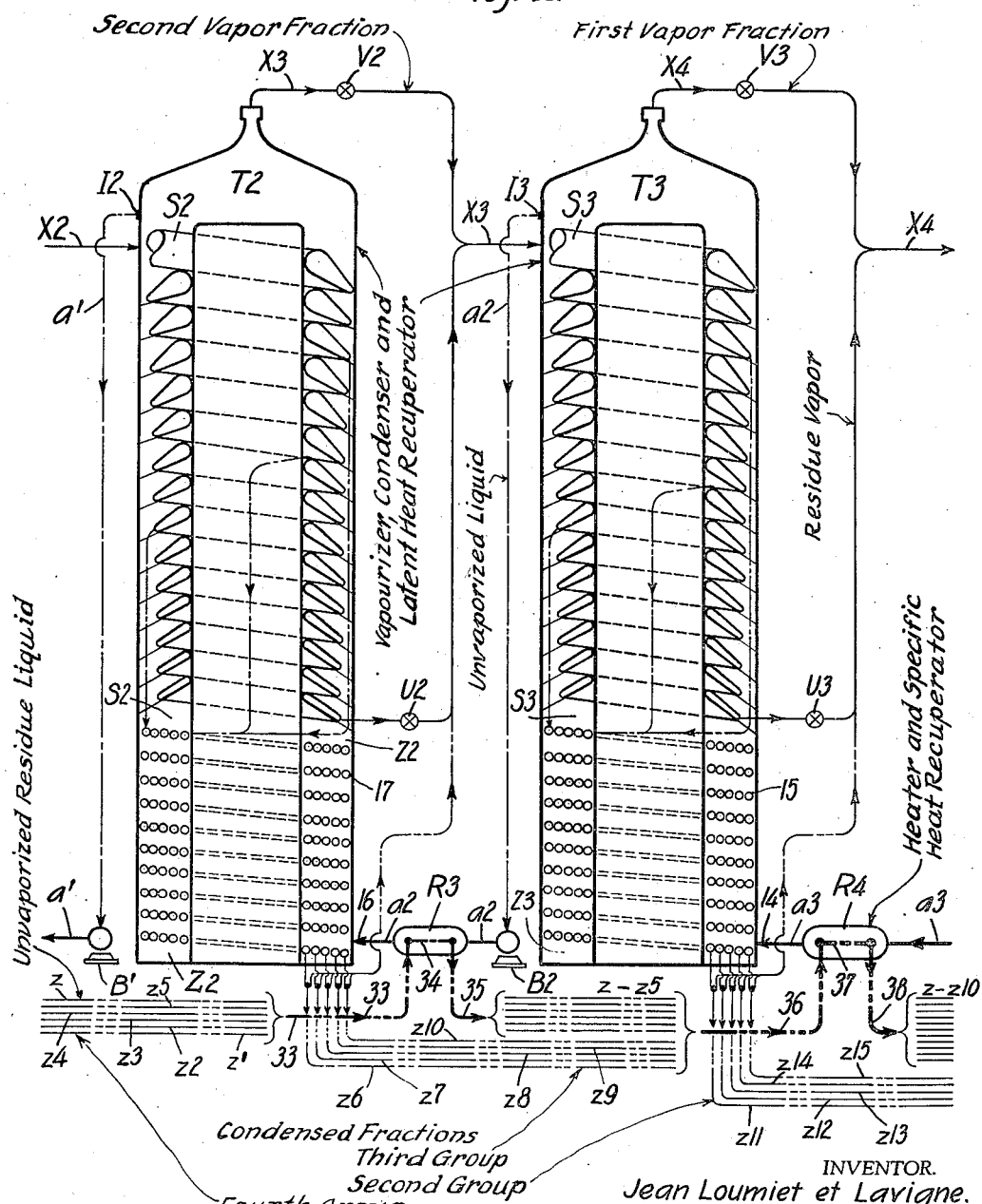
Fig. 2 is a view similar to Fig. 1, and illustrates a continuation of the distilling apparatus of Fig. 1, from left to right.
Figure 3:
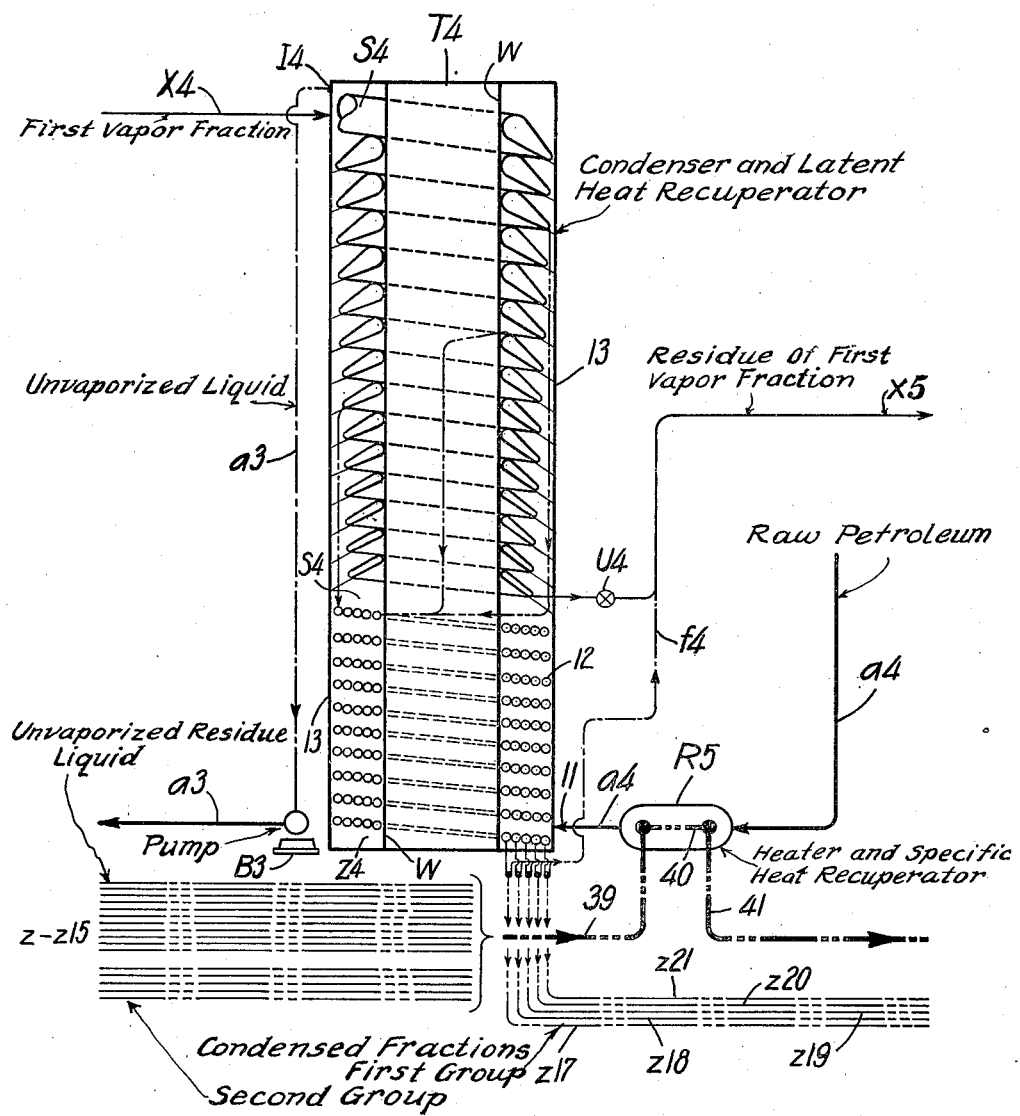
Fig. 3 illustrates similarly a continuation of the distilling apparatus of Fig. 2, from left to right.
Figure 4:
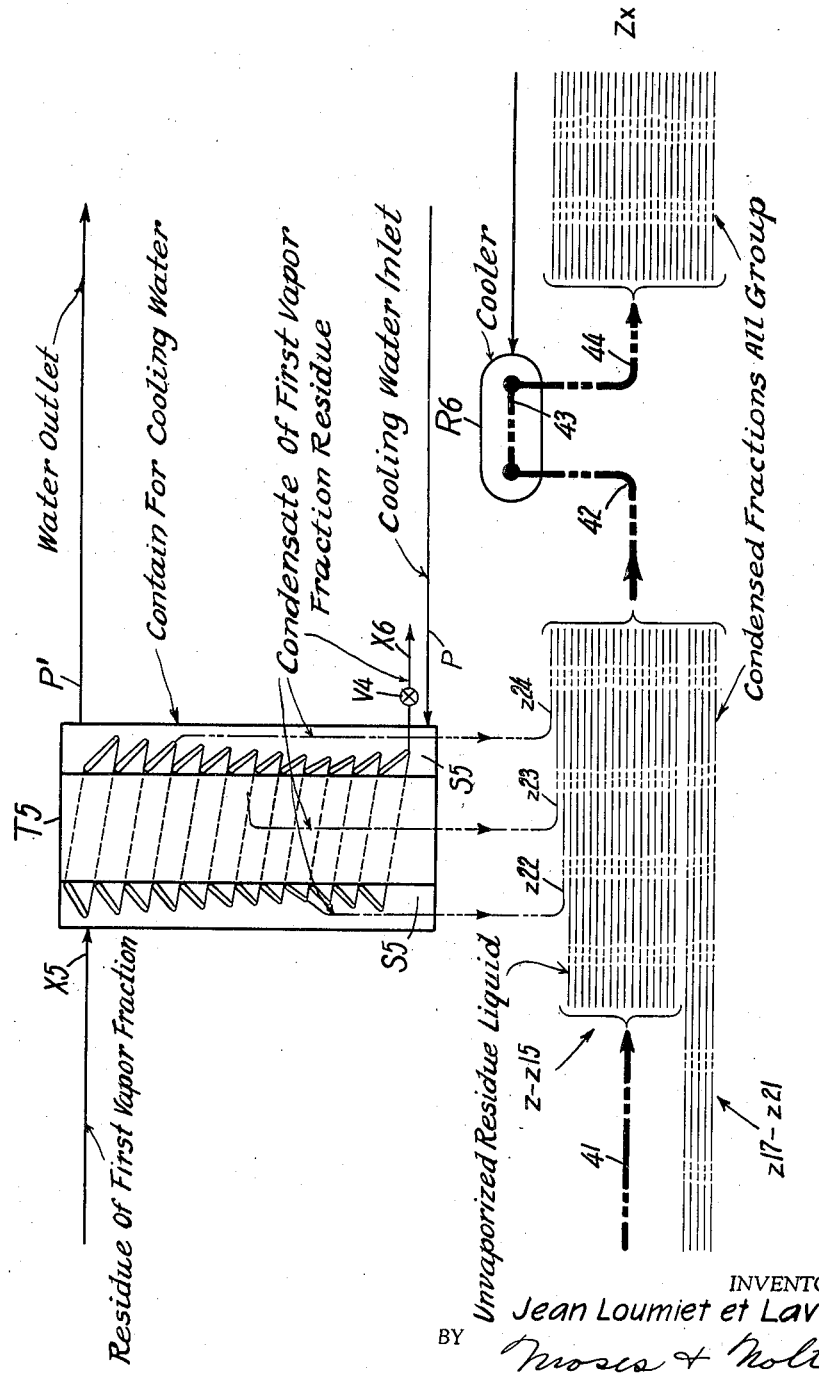
Figure 5:
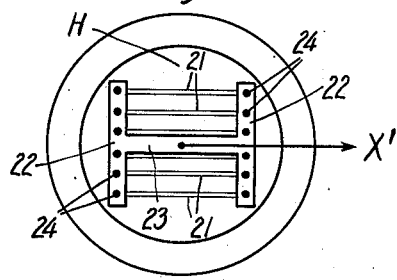
Figure 6:
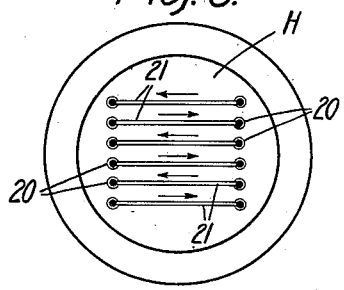
Figure 7:
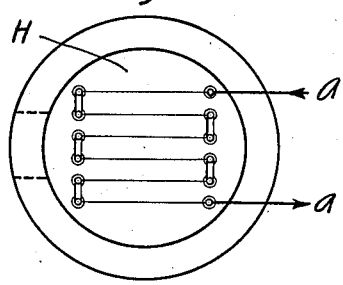
Figure 8:
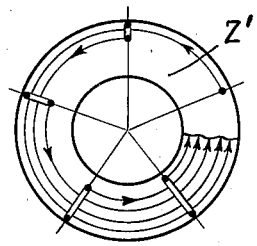
Figure 9:
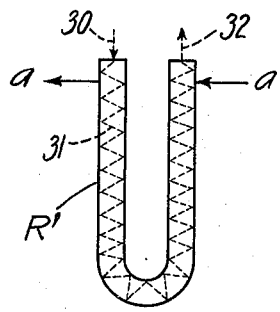
Figure 10:
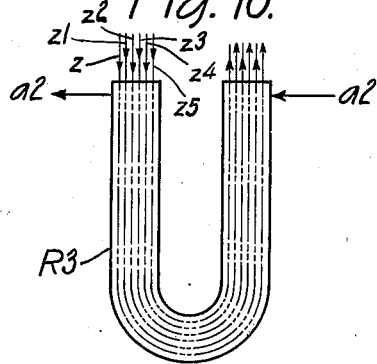
Figure 11:
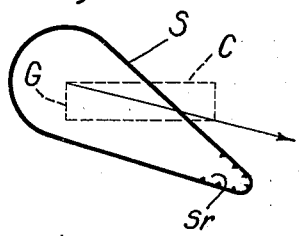
Figure 12:
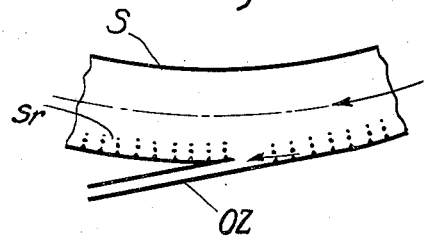
Figure 13:
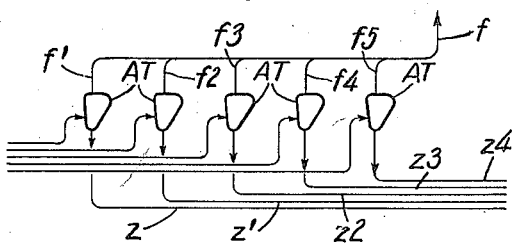
Figure 14:
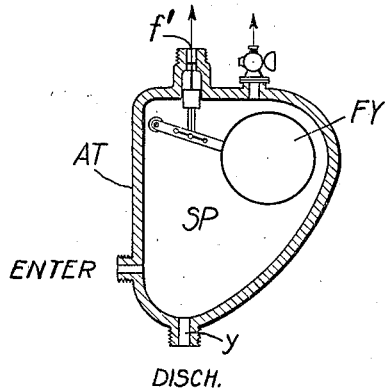
Figure 15:
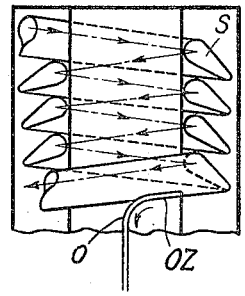

Fig. 4 similarly illustrates a terminal portion of the apparatus of the preceding figures, being in continuation of Fig. 3 from left to right;

Fig. 5 is a view in horizontal sectional detail taken on the line 5—5 of Fig. 1, the arrows at the end of the line indicating the direction in which the view is taken;

Fig. 6 is a similar horizontal sectional detail on the line 6—6 of Fig. 1;

Fig. 7 is a horizontal sectional detail on the line 7—7 of Fig. 1;

Fig. 8 is a horizontal sectional detail on the line 8—8 of Fig. 1;

Fig. 9 is a fragmentary detail view in plan of the heater R' shown in Fig. 1, taken separately;

Fig. 10 is a similar detail view in plan of the heater R3 shown in Fig. 2, taken separately;

Fig. 11 is a detail view on an enlarged scale of a typical cross-section of the helical tube component shown in Fig. 15, and this figure shows also a diagram of forces;

Fig. 12 is a fragmentary detail view in vertical longitudinal section of a portion of the helical tube structure shown at the lower part of Fig. 15, with part of a liquid-collecting tube connected thereto;

Fig. 13 is a schematic view illustrating in flow-sheet form a series of air traps, with their associated ducts;

Fig. 14 is a detail view in vertical section, on an enlarged scale, of an air-trap of the type shown in Fig. 13;

Fig. 15 is a fragmentary detail view in vertical section, somewhat schematic in character, of a modified form of helical distillation tube and associated extraction or collecting tube for the liquid product.

Fig. 16 shows a modified system.

In a now-preferred embodiment of the invention selected for illustration and description, and referring first more particularly to the structure shown in Figs. 1 to 4, inclusive, an apparatus is there illustrated intended for the fractional distillation of petroleum by multiple effects, and in which provision is shown for dividing the vaporization and condensation, each into four fractional steps, although it is to be understood that where desired a division into six, eight or more fractional steps may be effected, or, on the contrary, the division can be reduced to two or three operations.

Where the distillation involves operations to produce a relatively large number of fractions, there results a greater economy in fuel, and also a better analysis of the mixture, viz., a more perfect separation of its various constituents; but the cost of installation is greater.

In the apparatus now under description, the heating, vaporization and condensation are carried out in a series of zones confined within containers, the reference characters T', T2, T3, T4 and T5 designating generally the containers and the zones respectively confined thereby. Before describing their structural details, the flow of mixture through the system will be described with sufficient detail to permit a ready understanding of the novel process.

The raw petroleum enters the system through a suitable duct A4 (see Fig. 3), and, after being heated in a heater R5, this liquid supply stream enters the heater T4 at its lower part where indicated by the arrow point from which a lead line runs to the reference character 11 of Fig. 3, it being understood that the illustration in this respect, as in general, is of a schematic character whenever the operation can be so indicated without the need for illustration of structural details.

From this point of entry, the liquid rises in the container zone, following initially the helical path defined by the convolutions of a series of collecting pipes 12 which are co-extensive in breadth with the annular space Z4 defined by the outer wall 13 of the container T4 and an inner upright well W disposed concentrically therewithin.

The extension annular space above the coils 12, is occupied by a helical tubular structure or heating coil S4, the convolutions of which divide the space traversed by the rising liquid causing the rising liquid to travel in a helical path. The liquid is heated as it traverses this path in contact with the exterior of the coil S4. The coil S4 is almost hot enough to cause vaporization of the rising liquid to occur.

The rising liquid leaves the container T4 at the vent I4 and passes through duct A3 to the pump or impeller B3 by which it is impelled through continuations of the duct A3 and through heater R4 (see Fig. 2), to a point 14 where it is injected into the lower end of zone container T3. Therein it rises through a helical path Z3, defined, as in T4, initially by helical extraction coils 15, and then through a continuation of said path defined by the convolutions of a heating coil S3.

Vaporization is initiated continuously at the lower end of path Z3 and proceeds during the upward flow through that path and the continuation thereof along coil S3, the more volatile hydrocarbons being evaporated en route and then after their accumulation in the space T3, they pass out through duct X4 to heater T4 (see Fig. 3), entering the heating coil S4 therein to act in heating the original raw fluid supply as it flows up the spiral path defined by the convolutions of coil S4 in the manner already described.

After running through container zone T3 the petroleum goes out at I3 through duct $a2$ to pump B2 and is thereby impelled through heater R3 into lower part of container zone T2, as indicated at point 16. Therein it rises, as in the preceding containers, through a spiral path Z2 defined by collection coils designated generally 17, and around the convolutions of heating coil S2, being deprived in said path, and in the space T2, of the more volatile hydrocarbon constituents which it may still contain. These pass through duct X3 into the heating coil S3 of zone container T3, in order to heat the mixture rising in the helical path defined by convolutions of coil S3.

At the upper part of container zone T2, the residual petroleum comes out through I2 into a duct $a'$ and its flow may be traced thereby through pump B' and heater R2 (see Fig. 1), into the lower part of zone container T' at point 18. Therein it rises, as in the preceding container zones, along the convolutions of the collecting coils 19 through the helical path Z' to the continuation thereof formed by the convolutions of heating coil S', evaporating, in the course of its travel, and in the space T', the hydrocarbons of greater volatility remaining in it, which vaporous product comes out through the space T' into the duct X2 and through it into the heating coil S2 of container zone T2.

Finally, the petroleum issues from container T' through opening I' to duct $a$ and passes therethrough and through pump B and heater R' into the tubes of a boiler H where the least volatile vapor fraction desired is driven off, this boiler constituting the last zone and the only zone which is heated directly. The vapors produced in the boiler are condensed in the coil S' of the penultimate container T', causing therein the evaporation of less dense products, which, in turn, upon their condensation in the coil S2 of the container T2, evaporate the less dense products in it, and thus, in succession, on to the first container zone of the system, in this instance T5.

Further features of novelty in operation of my improved process of distillation will appear in connection with the following description of the apparatus as illustrated in the drawings.

The boiler H comprises upright tubes 20 disposed in vertical coils which stand one behind another when viewed as in Fig. 1, and the arrangement of which is shown clearly in the sectional views 5 to 7 inclusive.

The horizontal tubular components 21 of the coils, which connect the upper ends of the tubes 20, are situated in the plane of Fig. 6, and each tube 20 has an extension 24 above the plane of the cross-connections 21 to the plane of Fig. 5, in which latter plane are disposed manifolds 22, to receive the vaporous output of the tubes 20, 24, delivering it through a common cross tube 23 to the duct X' which delivers it to be condensed in, and to heat the coil S' of zone container T' in the manner already indicated.

It may be assumed that the petroleum does not become completely evaporated in the course of the distillation, and that approximately a fourth part is available in the form of a hot liquid which can be and preferably is, used to heat the heaters R', R2, R3, R4 and R5, in the order named, its course being traced from the point 29 at the bottom of boiler tubes 20 in Fig. 1, through duct 30, and duct 31 in heater R', etc., through ducts 33, 34, 35, 36, 37, 38, 39, 40, 41 and 42, to the refrigerator element R6, where it is cooled, if its viscosity will allow such cooling.

The vapors produced in boiler H flow through duct X' into the coil S' and their condensation in that coil is effected at a temperature higher than the temperature of evaporation of petroleum circulating in T', not only because the petroleum gives off in that zone more volatile hydrocarbons, but because the pressure within the coil S' is greater than that within the zone T'. Such conditions favor the transmission of heat between the vapor circulating in the coil and the liquid which surrounds it; and by virtue of such efficient transmission the condensation in the first and the evaporation in the second are promoted.

Moreover, some slight part of only relatively volatile hydrocarbons might possibly resist evaporation in zone T', and consequently might be found in the vapors produced in H which go through S'. Those hydrocarbons do not condense in S', or do so with difficulty, and in order to provide for such a contingency, the lower terminal S$x$ of coil S' is connected, as by a duct $b$ with the duct X2 which carries to coil S2 the vapors produced in zone container T'.

As already mentioned, a lower pressure prevails in the coil S2 and by means of such a pressure differential, which may be regulated by a cock U1 in duct $b$, and by a cock V' in the duct X2, the velocity head of the vapor as it passes through coil S' may be regulated. In turn, the pressure in the zone container T' is controlled by regulation of the impeller operations (B, B' etc.), and by the cock V', and in the same way the various pressures which it may be desirable to maintain in the zones T2 and T3, and in the boiler H, may be controlled and regulated.

The condensation within coil S' is effected progressively from top to bottom, beginning with the less volatile hydrocarbons, because the cooling becomes established progressively. Owing to the flow upwardly of the petroleum which cools the coil, the temperature of that petroleum is higher in proportion to its level, and consequently the fluid being condensed is subjected progressively to a cooling fluid of ever diminishing warmth.

At the same time, also, the pressure in the coil keeps diminishing slightly, and both of these conditions favor the progress of the condensing operations all along the coil. Such progressive condensation liquefies continuously and successively, in the order of their progressively lesser volatility, the hydrocarbons contained in the vapors which travel in the coil. As they become liquefied, the centrifugal force to which they are subjected by their tortuous progress at high speed through the helical coil keeps driving them toward the exterior wall of the small gathering channel formed by the outer inferior end of the coil section, where they are collected at intervals. The cross-sectional area of the bore of the coil is decreased gradually, or by steps, in order to compensate for the decrease in volume of fluid as the result of condensation. A suitable structure for this purpose is illustrated in Figs. 11, 12 and 15 of the drawings in which the tubular element is designated generally S. In the diagram of forces in Fig. 11, the arrow indicates the resultant of centrifugal and gravitational forces, the horizontal component C representing the moment of centrifugal force while the vertical component G represents the gravitational moment.

It may be noted that while only five collections of extractions for each coil have been shown in the present instance, the greater the number of such extractions the more fractional will be the petroleum output.

The collecting pipes Z—ZX respectively start tangentially to the convolution from which each springs, as shown at OZ in Figs. 12 and 15, but, as indicated clearly in the last-named figure, at 0, they keep curving and changing their direction until they become vertical, being disposed in contact with the inner surface of the exterior wall of the container at the region of such curvature (see ZZ, Fig. 1; etc.). They depart from the straight reaches, as ZZ, when they reach the bottom of the coil, as at the plane of the section line 8—8, (see Fig. 1) and at this region they are assembled in multiple transversely of the annular space, as Z', in which they follow a helical path downward, the lower terminals of these helical collection tubes being led out through suitable openings in the bottom of the container, as at z to z5 inclusive.

This assembly of collecting tubes occupy substantially the entire annular space Z', and their disposition and surface characteristics conform to the necessity of transmitting the entire available heat, within practical limits, from the liquids flowing in the collection tubes to the circumjacent helical stream of petroleum to be distilled, from the moment of its entrance to the first container zone, as at 18 in Fig. 1.

After issuing from the zone container T', and after previous separation of the vapors which may be entrained by the liquids circulated through the vapors, the collecting pipes z—z5 inclusive contribute successively to the heating of petroleum in the reheaters R3, R4 and R5, and are afterward cooled, as by water, in R6 before barreling or storing the products which they carry.

The present process of fractional vaporization and condensation with multiple effects does not require for its application that precisely the same quantity of heat be applied in each one of the successive fractionatings.

If, for example, it is desired to reduce the distillation operation performed in a zone because the petroleum treated contains a smaller quantity of hydrocarbons corresponding to the group which it is desired to evaporate in that zone, it will be sufficient to reduce the heating surface of the heat recuperators of that zone, and thereby reduce the recovery of heat in the zone. As a compensation, however, that heat not recovered in the zone referred to is additionally available for the recovery in the next colder zone, or in any of the colder zones as desired.

In order to effect the separation of the vapors entrained with each of the extracted liquids, provision is made in each of the extraction lines z—z5, etc., of an air trap similar to that shown at AT in Figs. 13 and 14 of the drawings.

The outlet for vapor from the first trap is shown at f' in Fig. 14, and is connected by the duct f leading to the coil S2 of the next following container, in which a lower pressure prevails. The vapor is thus inspired into the system, free from inspiration of liquid, which collects in the space SP of the trap, and may be withdrawn from the trap, as at y in Fig. 14. If liquid rises in the trap to an undesired height, the float FY rises thereon and shuts off the duct f' automatically.

Fig. 13 illustrates in flow-form an assembly of traps, like AT, associated with a system of ducts in which the reference characters z—z4 designate the discharge pipes, while the vapor outlet duct f has branches f', f2, f3, f4 and f5 leading each to the air outlet of one of the traps. The traps derive the collected fluid from the ducts leading respectively from the bank of helical coils Z'.

In the same way that the vapors produced in the boiler H feed the coil S1 and induce the evaporation of the more volatile products of the petroleum which runs through tank T', those products of tank T', when evaporated, feed the coil S2 and induce the evaporation of the more volatile products of the petroleum running through tank T2. The end of that coil S2 remains connected with coil S3 which is at a lower pressure and in consequence inspires the vapors from S2, inducing in the coil the speed of those vapors which is regulated by the cock U2. The vapors not condensed in S2 are thus condensed in coil S3 at lower pressure and temperature.

The operations in container zone T2 are carried out in the same way as described for container zone T'. After issuing from the container zone T2, the collecting pipes for the condensed liquids, once deprived of the vapors entrained by those liquids, heat the re-heaters R4 and R5 and are afterwards cooled in R6 with cold water, before the products which they carry are barrelled.

The vapors produced in T2 are carried in turn to coil S3 which heats tank T3 and induce the evaporation of the more volatile products which run through that tank, namely the raw petroleum. In that tank T3 the naphtha is evaporated. The end of S3 is connected with the coil S4 which heats the petroleum which circulates in the heater C which is at a lower pressure, the speed of the vapor in coil S3 induced by that difference of pressure being regulated by the stopcock U3. The vapors not condensed in S3 are thus carried to coil S4 which operates at a lower pressure.

The operations in tank T3 are effected in the same way as in T' and T2. The collection pipes of the liquids condensed in that tank, when issuing from the same, and the dragged vapors having been separated, heat the heater R5 and are afterwards cooled with cold water in the cooler R6, before barreling the products which they carry.

The naphtha vapors produced in T3 pass on to coil S4 where the less volatile ones are condensed, heating the raw petroleum to be distilled. The naphtha vapors which are not condensed in coil S4 are conveyed to another coil S5 cooled with water, where their liquefaction is definitely ended. The end of coil S5 issues freely into the air at X6 in order to allow the passage of uncondensable gases that might exist, that passage being regulated by the cock V4.

The passage of the vapors through all the successive coils is effected owing to the difference of pressure between the boiler and the atmosphere, and regulating the successive increases of the pressures in the various tanks by means of the cocks V, V', V2, V3, V4, U', U2, U3 and U4.

The coils and the pressures are determined so that with the difference of temperatures existing between the heating vapor and the heated fluid, the transmission of heat through one coil shall correspond to the amount of evaporation required to maintain the velocities of the vapors in the coils sufficiently high to correspond with the necessities of the separation, and so that the loss of pressure by the passage of the vapor at that velocity in each coil shall represent the difference of pressure existing between two successively connected container zones.

The collection pipes of liquids condensed in the coil of the heater T4 are arranged similarly to those of the collecting pipes in the tanks T', T2 and T3, and in the lower part of that heater they heat the petroleum to be distilled. When issuing from that heater and after previous separation of the vapors entrained by them, they proceed to the cold water cooler R6, and afterwards to the barreling stage.

The collection pipes of the liquids condensed in coil S4 are directly conveyed to the cold water cooler R6 so that these liquids become cooled before being barrelled.

The mechanical separation, which is effected by means of centrifugal force, in the various coils of that apparatus, of the liquid which keeps condensing in them, and in the measure that that condensation is effected, constitutes the novel method of distillation disclosed and claimed in my co-pending application, Serial No. 99,317.

In principle, we must admit that the aforesaid mode of operation is not perfect, and that the progressive condensation of a mixture does not, in a strictly absolute manner, liquefy its components according to their volatilities; because before one hydrocarbon has been exhausted in the vapor mixture, the condensation of another more volatile hydrocarbon has been initiated.

That obstacle to the attainment of a perfect analysis is reduced in centrifugal condensation, because the latter does not encounter the fact characteristic of every other method of distillation that a less volatile body will exist united with more volatile vapors, as much in the vapor state as in the liquid state, in the state of infinitesimal entrained drops. In centrifugal separation practically no bodies of less volatility are entrained in the liquid state by less volatile vapors, because the whole of the liquid is separated by centrifugal force.

The analysis of the products is improved in centrifugal separation by employing a feature of the process of my invention as disclosed in my co-pending application Serial No. 116,333, filed December 17, 1936. Said feature consists in subjecting the liquid to the heating action of friction developed in a thin and preferably rugose channel for the liquid separated within the channel of a coil having approximately the typical cross-section illustrated in Fig. 11 of the present application. Such rugosity is indicated at Sr in Figs. 11 and 12. The friction there produced by the flowing vapor is thus increased, consequently inducing a rise of temperature which heats the separated liquid and evaporates its more volatile components, driving them back toward the interior of the coil. As that friction is due to work performed by the circulating vapor, consequently the performance of that work is accompanied by an equivalent decrease in the heat-energy which the vapor possesses. Such decrease of heat-energy is accompanied by a condensation which is caused by the cold produced in the interior of the fluid, and which, in its liquefying effect, must select the less volatile hydrocarbons more efficiently than the exterior cold which is transmitted by contact; since the latter affects directly only the layers which circulate along the walls.

I have found that by means of the friction induced in the small channel for the collection of the liquids separated in the coil, two rectifying effects are obtained in that coil. First: a rectification of the circulating vapor, by the condensation of its less volatile elements. Second, a rectification of the separated liquid, by the evaporation of its more volatile elements. The application of that invention can, therefore, be advantageously effected in conjunction with the new novel process herein disclosed.

The foregoing description is intended to disclose a particular application of the process; but, of course, many details are susceptible of modification.

I wish particularly, to point out the possibility of dividing the distillation container zones into two series; the container zones of one series alternating with those of another in such a way that if the containers are numbered in the order in which the mixture to be distilled runs through them, the even numbered containers belong to one series and the odd numbered containers belong to another series.

So, also the boiler which ends the distillation of the petroleum may be divided into two boilers or tanks, one heated by the gases from an oven and the other, at a lower temperature, by water vapor at high pressure; and the multiple effects are established only between one of the boilers and the containers of the same series.

For instance, if the installation comprises 8 tanks and two boilers, one of them heated by vapor, the boiler heated by a furnace and tanks 8, 6, 4 and 2 will constitute a group of quintuple effects, and the second boiler, heated with vapor will constitute in conjunction with containers 7, 5, 3 and 1, another group of quintuple effects, independent of the first; and it is contemplated that the temperatures of the successive tanks from 8 to 1 shall decrease with suitable and continuous regularity.

This system is illustrated in Fig. 16. The petroleum enters through tube 50 and by means of the pumps 51 it travels successively through the units or zones 52 to 59 inclusive and through the two primary heaters 60 and 61, one of which 61 being heated by a furnace and the other 60 being heated by steam.

Each unit 52 to 59 inclusive is the same in construction and operation as the units T shown in Figs. 1, 2 and 3. The vapors generated in the heating zone 60 pass by tube 63 into the unit or zone 58, supplying heat to the liquid therein for vaporization, the entering vapors being subjected to fractional condensation. The vapors generated in unit 58 pass by its tube 63 to zone 56. It will now be understood that the vapors generated in each even numbered zone pass into the next even numbered zone to the right of it, and there are fractionally condensed by the counter flowing liquid petroleum.

Similarly the vapors generated in heating zone 61 pass by tube 65 to unit or zone 59 and the vapors generated in each odd numbered zone passes by its tube 65 to the next odd numbered zone to its right.

The liquid petroleum is preheated in the preheaters 70 by the residue and condensates as in the system shown in Figs. 1 to 4. The condensate withdrawal pipes are indicated by dotted lines on Fig. 16.

I have described what I believe to be the best embodiments of my invention. I do not wish, however, to be confined to the embodiments shown, but what I desire to cover by Letters Patent is set forth in the appended claims.

I claim:

1. The method of distillation which comprises providing a single primary heating zone, transmitting the liquid to be distilled toward the primary heating zone for progressive heating and vaporization through a succession of zones maintained at successively higher pressures and temperatures, including the passing of the unvaporized residue of each zone on to the next hotter zone, and finally to the primary heating zone, returning the vaporized product of each zone to the next colder zone for condensation therein, passing the vapor to be condensed in each instance through the zone in which it is to be condensed in the opposite direction to the flow of liquid through such zone, while maintaining the outgoing vapor and the incoming liquid separate but in intimate heat exchanging relation, and passing the outgoing unvaporized residue from the primary heating zone and the condensate from each zone into heat exchanging relation with the incoming unvaporized liquid as the unvaporized liquid reaches each of the colder zones, the outgoing liquids passing through the zones in descending temperature order, and in such manner that the heat of the residue and condensed liquids as well as the latent heat of vaporization is all recovered at progressively lower temperatures (exclusive of losses to the outside air) by transfer to the liquid being heated, and the heat recovery of the several zones is apportioned in a desired relation appropriate to the heating and vaporization to be performed in the respective zones, the pressure increase from zone to zone being sufficient in each instance to bring about a sharp difference of temperature between the vapor fraction evaporated in a zone of higher temperature and pressure, and the liquid to be evaporated in the zone of next lower temperature and pressure, whereby the rapid and economical transference of heat from such vapor to such liquid is effected.

2. The process of fractional distillation by multiple effects as claimed in claim 1 in which latent heat of vaporization is applied to the fluid stream in one or more zones by a counter flow therethrough of vaporous products, in confinement to a tortuous path within the zone or zones, wherein the vaporous products are subjected to separating action by the resultant of centrifugal force and gravity.

3. The process of fractional distillation by multiple effects as claimed in claim 1, in which latent heat of vaporization is applied to the fluid stream in one or more zones by a counter flow therethrough of vaporous products travelling at high velocity, in confinement to a tortuous path of gradually decreasing capacity within each zone, wherein these vaporous products are subjected to separating action by the resultant of centrifugal force and gravity, whereby condensation of the vaporous constituents of said counter-flowing vapors supervenes in proportion inversely to the relative volatility of the several constituents, and as those condensed liquids come into being they are projected against the walls of the confining structure by the centrifugal force, and are collected and extracted for further disposition.

4. The process of fractional distillation by multiple effects as claimed in claim 1, in which latent heat of vaporization is applied to the fluid stream in one or more zones by a counter-flow therethrough of vaporous products travelling at high velocity, in confinement to a tortuous path of gradually decreasing capacity within each zone, wherein these vaporous products are subjected to separating action by the resultant of centrifugal force and gravity, whereby condensation of the vaporous constituents of said counter-flowing vapors supervenes in proportion inversely to the relative volatility of the several constituents, and as those condensed liquids come into being they are projected against the walls of the confining structure by the centrifugal force, and are collected and extracted for further disposition, and wherein the uncondensed vapors are transmitted to the next colder zone for further condensation.

5. The process of fractional distillation by multiple effects as claimed in claim 1, in which latent heat of vaporization is applied to the fluid stream in one or more zones by a counter flow therethrough of vaporous products, in confinement to a tortuous path within the zone or zones, wherein they are subjected to separating action by the resultant of centrifugal force and gravity, and wherein the separated, condensed liquid is caused to travel in contact with a rugose surface for promoting rectification.

6. A process of fractional separation of petroleum involving fractional vaporization and fractional condensation, in which the petroleum to be vaporized is caused to travel progressively through successive zones where the several fractional vaporizations take place in ascending temperature and pressure order, and all the products of the distillation including the vapors produced in each fractional vaporization, the condensate of those vapors, and the final residue liquid are caused to run in a contrary or inverted direction and order through the colder fractional vaporization zones where they are utilized as heating fluids to heat the petroleum to be vaporized and the pressure increase from zone to zone being sufficient in each instance to bring about a sharp difference of temperature between the vapor fraction evaporated in a zone of higher temperature and pressure, and the liquid to be evaporated in the zone of next lower temperature and pressure, whereby the rapid and economical transference of heat from such vapor to such liquid is effected, the process being characterized by the fact that to each fractionating zone other than that of highest temperature the heat contained in the residue and condensate liquids issuing from the zone of next higher temperature and the latent heat of vaporization contained in the vapor which issues from the zone of next higher temperature are delivered (excepting the outside losses by cooling caused by the surrounding air), the whole of the heat provided in the zone of highest temperature being transmitted to the second zone and constituting the only means for vaporization of the liquid in the second zone; and the whole of the heat contained in the residue and condensate liquids and in the vapors issuing from each zone constituting the only means for vaporization of the liquid in the zone of next lower temperature and being totally transmitted to such zone of lower temperature, (excepting the outside losses), there being thus maintained through its successive re-employment in the several fractionatings a uniform quantity of available heat for each one of those operations, (excepting outside losses) whereby the thermal equilibrium of the operations in the several zones is attained; the liquid being heated as it passes through the several zones toward the zone of highest temperature being subjected first to heating by the residue and condensation liquids and then by the vapors from the next hotter zone; the total quantity of heat put in the liquid in the several zones being allocated or apportioned by regulating the heat exchanging capacity between the liquid being heated, on the one hand, and the residue and condensation liquids on the other.

7. The fractional distillation process consisting in the establishment of a primary zone heated by outside means and a series of secondary zones of progressively lower pressures starting from the primary zone, and said zones being successively travelled by the operated liquid from the last one down to the primary one; in which course the liquid is heated and vaporized by the calefaction brought on to each zone by the vapors distilled in the anterior zones, by the residue which runs through all those zones in counter-current to the operated liquid and by the condensations produced in each zone which also run at counter-current to the operated liquid in each one of the zones posterior to that in which they were produced; to which effect the operated liquid is maintained in all those zones successively or simultaneously in heat exchanging relation but out of contact with the said heating fluids and the motion of the operated liquid from one zone to the following one is effected by pumping to secure a regulated increase of pressure from zone to zone and thereby to secure an efficient difference of temperature in each instance between the liquid to be evaporated and the vapor which heats such liquid.

8. The process of fractional distillation consisting in providing a plurality of primary heating zones heated by outside means, and for each one of those primary zones a series of secondary zones with an equal number of zones in each series; in causing the operated liquid to run through that succession of zones so as to interpose between the connections between two successive secondary zones corresponding to one primary heating zone, one secondary zone of each one of the other series; in which course the operated liquid is raised in temperature and evaporated by the heat which it receives in each zone from the vapors produced in the anterior zones of the same series those vapors flowing exclusively through the zones of their own series in inverse direction to that of the operated liquid and becoming condensed in the same; also by the heat which the operated liquid receives from the residue which runs through the successive zones at counter-current becoming gradually cooled in the same; and by the heat which said operated liquid receives from the condensations of the vapors that are condensed in the secondary zones and run at counter-current through the zones posterior to the zone in which they were condensed; and in each secondary zone the transmission of the heat between the vapor which is condensed and the liquid which is vaporized is effected by maintaining both fluids in heat exchange relation through a metallic wall, and the transmission of heat from the residue and from the condensations to the operated liquid which is heated is also effected in a similar way.

9. A process as described in claim 8 characterized by the fact that the successive zones traversed by the liquid are at pressures higher by steps, the pressure increasing in the direction of the motion of the liquid; those pressures being established by the pumping of the liquid from one zone to the following one.

10. The combination of the process described in claim 7 with the fractional condensation and separation process which consists in causing the vapors undergoing condensation in each zone to travel at great velocity in a helicoidal path of progressively diminishing cross-sectional area to separate the condensate from the vapors, and in withdrawing the condensate from the vapors at intervals along such path.

11. The process as described in claim 8 characterized by the fact that the successive zones traversed by the liquid are at pressures higher by steps, the pressure increasing in the direction of the motion of the liquid, those pressures being established by the pumping of the liquid from one zone to the following one, and further characterized by the inclusion of the fractional condensation and separation process which consists in causing the vapors undergoing condensation in each zone to travel at great velocity in a helicoidal path of progressively diminishing cross-sectional area to separate the condensate from the vapors, and in withdrawing the condensate from the vapors at intervals along such path.

JEAN LOUMIET ET LAVIGNE.